(12) United States Patent
Jang et al.

(10) Patent No.: US 8,434,786 B2
(45) Date of Patent: May 7, 2013

(54) FRONT AIRBAG INCLUDING SUB-STRING AND VENT PART

(75) Inventors: Sung Geun Jang, Gangwon-do (KR); Ho Yong Lee, Gangwon-do (KR)

(73) Assignee: Autoliv Development AB, Vargarda (SE)

( * ) Notice: Subject to any disclaimer, the term of this patent is extended or adjusted under 35 U.S.C. 154(b) by 161 days.

(21) Appl. No.: 12/963,041

(22) Filed: Dec. 8, 2010

(65) Prior Publication Data

US 2011/0133437 A1 Jun. 9, 2011

(30) Foreign Application Priority Data

Dec. 9, 2009 (KR) .......................... 10-2009-0121733

(51) Int. Cl.
*B60R 21/2338* (2011.01)

(52) U.S. Cl.
USPC ....................................... 280/743.2; 280/739

(58) Field of Classification Search .............. 280/743.2, 280/743.1, 742, 728.1, 730.1, 739
See application file for complete search history.

(56) References Cited

U.S. PATENT DOCUMENTS

| | | | | |
|---|---|---|---|---|
| 6,709,008 B2 * | 3/2004 | McGee et al. | ................ | 280/729 |
| 7,192,053 B2 * | 3/2007 | Thomas | ........................ | 280/739 |
| 7,354,064 B2 * | 4/2008 | Block et al. | ................ | 280/743.2 |
| 7,552,942 B2 * | 6/2009 | Fischer et al. | ............. | 280/743.2 |
| 7,621,561 B2 * | 11/2009 | Thomas et al. | ............ | 280/743.2 |
| 7,762,576 B2 * | 7/2010 | Cho | ............................ | 280/729 |
| 7,810,839 B2 * | 10/2010 | Denys et al. | ................... | 280/739 |
| 7,954,850 B2 * | 6/2011 | Fischer et al. | ............. | 280/743.1 |
| 2002/0036400 A1 * | 3/2002 | Winters et al. | ............. | 280/743.2 |
| 2002/0096871 A1 * | 7/2002 | Pinsenschaum et al. | .. | 280/743.2 |
| 2002/0125706 A1 * | 9/2002 | Greib et al. | ................ | 280/743.2 |
| 2002/0175511 A1 * | 11/2002 | Dunkle et al. | ............. | 280/743.2 |
| 2004/0046376 A1 * | 3/2004 | Ryan | .......................... | 280/743.2 |
| 2005/0057029 A1 * | 3/2005 | Thomas | ..................... | 280/743.2 |
| 2005/0098990 A1 * | 5/2005 | Pinsenschaum et al. | ..... | 280/739 |
| 2007/0045997 A1 * | 3/2007 | Abe et al. | ...................... | 280/729 |
| 2008/0042416 A1 * | 2/2008 | Razazi et al. | .............. | 280/743.2 |
| 2008/0179866 A1 * | 7/2008 | Maertens | ..................... | 280/739 |
| 2008/0203713 A1 * | 8/2008 | McFadden et al. | ........... | 280/739 |
| 2009/0212538 A1 * | 8/2009 | Abe et al. | ...................... | 280/729 |
| 2010/0109303 A1 * | 5/2010 | Abe et al. | ...................... | 280/739 |
| 2010/0140910 A1 * | 6/2010 | Fischer et al. | ............. | 280/743.2 |
| 2010/0225095 A1 * | 9/2010 | Smith et al. | ................... | 280/729 |
| 2011/0031723 A1 * | 2/2011 | Fischer et al. | ............. | 280/730.1 |
| 2011/0079988 A1 * | 4/2011 | Bauer et al. | ................ | 280/728.1 |
| 2011/0101652 A1 * | 5/2011 | Abe | ............................. | 280/728.3 |
| 2011/0133437 A1 * | 6/2011 | Jang et al. | ................... | 280/743.2 |
| 2011/0140401 A1 * | 6/2011 | Fischer et al. | ............. | 280/743.1 |
| 2011/0198828 A1 * | 8/2011 | Fischer et al. | ............. | 280/743.2 |
| 2011/0309605 A1 * | 12/2011 | Kumagai | ....................... | 280/741 |
| 2012/0068446 A1 * | 3/2012 | Miyata et al. | .............. | 280/743.2 |
| 2012/0074677 A1 * | 3/2012 | Hiruta et al. | ................... | 280/739 |
| 2012/0104734 A1 * | 5/2012 | Fischer et al. | ............. | 280/730.1 |
| 2012/0104737 A1 * | 5/2012 | Fischer et al. | ................ | 280/742 |
| 2012/0153603 A1 * | 6/2012 | Mallinger et al. | ............ | 280/739 |

* cited by examiner

*Primary Examiner* — Ruth Ilan
*Assistant Examiner* — Karen Beck
(74) *Attorney, Agent, or Firm* — Brinks Hofer Gilson & Lione

(57) ABSTRACT

A front airbag including a sub-string and a vent. The front airbag attenuates impact in order to provide protection to a child or an occupant in an abnormal position on a passenger seat. Upon a vehicle collision, the front airbag discharges internal air through a vent provided at the lateral surface of the front airbag, if the front airbag is not inflated at the front, but is instead laterally inflated. The front airbag includes a main tether provided at a central portion of an airbag cushion, a vent selectively discharging air to an outside from the front airbag, and a sub-string, connected to and between the main tether, to control opening/closing of the vent part.

7 Claims, 8 Drawing Sheets

FRONT AIRBAG INCLUDING SUB-STRING AND VENT PART

BACKGROUND

1. Field of the Invention

The present invention relates to a passenger airbag, capable of attenuating impact, together with a seat belt, in order to protect a child or an occupant in an abnormal position on a passenger seat and protecting and restraining the head of the occupant even when the occupant moves upon vehicle collision, thereby improving the overall restraining power for the occupant.

2. Description of Related Technology

In general, airbag modules are installed in a steering wheel and an instrument panel to protect a driver and a passenger, respectively, from being injured during a vehicle collision.

Upon vehicle collision, the airbag module deploys an airbag to prevent the driver or the occupants from colliding with the steering wheel, instrument panel or windshield, so that the driver and occupants are prevented from being injured.

The airbag module includes an airbag housing cover, an inflator to generate gas upon vehicle collision, an airbag deployed due to the gas generated from the inflator, and an ECU (electronic control module) equipped with an additional sensor and configured to cause the exploding of a detonator.

The inflator includes the detonator, which is fired under an operation control signal output from the ECU, and a gas generator, which generates the inflation gas as the detonator is fired.

In general, if the driving speed of the vehicle is significantly attenuated due to the head-on collision, the impact sensor detects the reduction of the driving speed and generates a preset signal. Then, the ECU, which has received the signal from the impact sensor, ignites the detonator to combust the gas generator.

In this case, since the gas generator rapidly generates gas, the airbag is rapidly inflated and deployed, and the airbag cushion, which has been deployed, prevents the head and the chest of an occupant from being moved to the front due to inertia, thereby protecting the occupant from an accident. Simultaneously, expanded gas is discharged through vent holes formed in the airbag cushion to absorb impact energy and effectively attenuate impact applied to the occupant upon collision, so that the occupant can be prevented from being injured.

In addition, a tether, usually formed as a single piece of fabric, is provided internally of the airbag such that the airbag has a stable shape when the airbag is deployed. The tether maintains the airbag in the stable shape such that the airbag sufficiently performs a buffering function when the airbag is expanded and is attached to the centers of the inner parts of front and rear surfaces of the front airbag.

FIG. 1 generally shows the operation of an airbag 1 when an occupant is normally seated. Conventionally, upon vehicle collision, the front airbag 1 is fully inflated at the front of a vehicle when an occupant 2 is in a normal seating position on a passenger seat with respect to the front airbag 1, thereby sufficiently protecting the occupant 2.

FIG. 2 generally shows the operation of the airbag when the occupant 2 is abnormally seated. As shown in FIG. 2, since the occupant 2 collides with the airbag 1 when the head of the occupant 2 is bent forward from the passenger seat, the airbag 1 makes contact with the occupant 2 before the airbag 1 is fully inflated in front of the occupant 2. Therefore, the airbag 1 may be inflated toward the lateral sides of the occupant 2. In other words, when the lateral inflation occurs, since the airbag 1 has been already filled with air, the airbag 2 cannot sufficiently attenuate the impact applied to the occupant 2 at the front.

SUMMARY

An object of the present invention is to solve the above problems of the known technology. In achieving the above, the present invention provides a front airbag that includes a sub-string and a vent, which together are capable of selectively discharging the internal air of the front airbag through the sub-string, provided at the central portion of the front airbag, and the vent, provided at the lateral surface of the front airbag, in order to prevent impact absorbing performance from being weakened due to the lateral inflation of the front airbag with respect to a grown person (or a child) situated in an improper or abnormal position on a passenger seat.

Another object of the present invention is to provide a front airbag, including a sub-string and a vent, capable of discharging the internal air of the front airbag through the vent when the front airbag is laterally inflated, and capable of preventing the internal air of the front airbag from being discharged by closing vent holes of the vent when the front airbag is not laterally inflated.

Still another object of the present invention is to provide a front airbag, including a sub-string and a vent, in which a folding part constitutes a portion of a main tether provided at the central part of the front airbag, the sub-string entering in the folding part is loosened or tightened by a plurality of sealing lines, according to if the front airbag is laterally inflated or not, the sealing lines are maintained in an original state when the front airbag is laterally inflated so that the sub-string is tightened to open the vent, and the sealing lines are torn when the front airbag is not laterally inflated so that the sub-string is loosened to close the vent, thereby selectively discharging the internal air of the front airbag.

In order to accomplish the above objects, the present invention provides a front airbag, including a sub-string and a vent, deployed by gas supplied from an inflator of an airbag module to protect an occupant of a vehicle. The front airbag includes a main tether installed at a central portion of an airbag cushion; a vent selectively discharging air to an outside from the front airbag, in which the vent includes an inner vent part, connected to the sub-string to discharge internal air of the front airbag, and an outer vent part, overlying with the inner vent part, to discharge the internal air of the front airbag, and the outer and inner vent parts being sealed and bonded to each other by a bonding part; and the sub-string being connected to the main tether to control open/close of the vent.

In another aspect of the present invention, the inner vent part includes an inner vent hole to discharge the internal air of the front airbag, the outer vent part includes an outer vent hole alternately aligned with the inner vent hole, or a plurality of inner and outer vent holes are provided and alternately aligned with each other, so that the internal air of the front airbag is discharged to the outside when the inner and outer vent parts are spaced apart from each other creating a communication channel between the inner and outer vent holes.

In still another aspect of the present invention, the sub-string includes an inner vent part connection end and the inner vent part includes a sub-string connection part, so that the inner and outer vent parts are spaced apart from each other due to tension of the sub-string when the front airbag is laterally inflated.

In still yet another aspect of the present invention, the main tether includes a folding part, receiving the sub-string and fixedly coupled with the sub-string, the sub-string includes a main tether fixture end entering the folding part, and the folding part of the main tether includes a sealing line fixedly coupling the folding part with the main tether fixture end such that the folding part is integrated with the main tether fixture end in a state in which the main tether fixture end enters the folding part.

In still yet another aspect of the present invention, a plurality of sealing lines fixedly couple the folding part with the main tether fixture end, and the sealing lines are sequentially torn from an upper most sealing line when the front airbag is laterally expanded.

In still yet another aspect of the present invention, the sub-string is tightened when the front airbag is laterally inflated, and the sub-string is loosened when the front airbag is not laterally inflated as the sealing lines are sequentially torn. The inner vent part is spaced apart from the outer vent part such that the internal air of the front airbag is discharged to an outside when the airbag is laterally inflated. The inner vent part is immediately adjacent to the outer vent part when the front airbag is not laterally inflated, so that the internal air of the front airbag is not discharged to the outside.

As described above, the present invention can have the following effects through the combination and the operating relation between units solving the problems and following components.

According to the present invention, the front airbag includes the sub-string provided at the central portion and the vent part provided at the lateral surface so that the internal air of the front airbag can be selectively discharged, thereby preventing impact absorbing performance from being lessened due to the lateral inflation of the front airbag with respect to a grown person or a child in an abnormal seating position on a passenger seat.

According to the present invention, the intrinsic function of the front airbag can be sufficiently performed to provide protection to an occupant situated in a normal position on a passenger seat by preventing the internal air of the front airbag from being discharged by closing vent holes of the vent part when the front airbag is not laterally inflated.

According to the present invention, a folding part constitutes a main tether provided at the central part of the front airbag, the sub-string entering in the folding part is loosened or tightened by a plurality of sealing lines according to if the front airbag is laterally inflated or not, the sealing lines are maintained in an original state when the front airbag is laterally inflated, so that the sub-string is tightened to open the vent, and the sealing lines are torn when the front airbag is not laterally inflated, so that the sub-string is loosened to close the vent, thereby selectively discharging the internal air of the front airbag.

According to the present invention, the restraining power of the front airbag is required to improve the performance of the passenger airbag against vehicle collision while preventing an occupant or a child in an abnormal position on the passenger seat from being injured. Accordingly, when vehicle collision occurs while the occupant or the child is abnormally seated in the passenger seat, the front airbag is laterally inflated, so that vent holes of the vent provided at the lateral surface of the front airbag are open, thereby reducing the likelihood that the head of the occupant or child will be injured due to the pressure of the airbag. In addition, when the vehicle collision occurs in a state in which a person is normally seated, the vent holes of the vent at the lateral surface of the front airbag are closed, so that injures of the person can be attenuated.

DETAILED DESCRIPTION

Hereinafter, the structure of a front airbag, including a sub-string and a vent according to an exemplary embodiment of the present invention, will be described in detail with reference to accompanying drawings.

Prior to explaining the detailed description, it should be understood that the terms or words used in the present specification and claims are not to be limited to common meanings or dictionary meanings, but interpreted with a meaning or a concept appropriate to the technical scope of the present invention, under the principle that the inventor can coin new words to explain the present invention in the best manner.

Accordingly, the embodiments described in the present specification and the structure shown in accompanying drawings are only for illustrating the exemplary embodiments of the present invention within the technical scope of the present invention. A person skilled in the art should comprehend that various equivalents and modifications can be made in place of the embodiments.

Hereinafter, the structure of the front airbag including a sub-string or a vent part according to exemplary embodiment of the present invention will be described in detail with reference to accompanying drawings.

Figure 1:
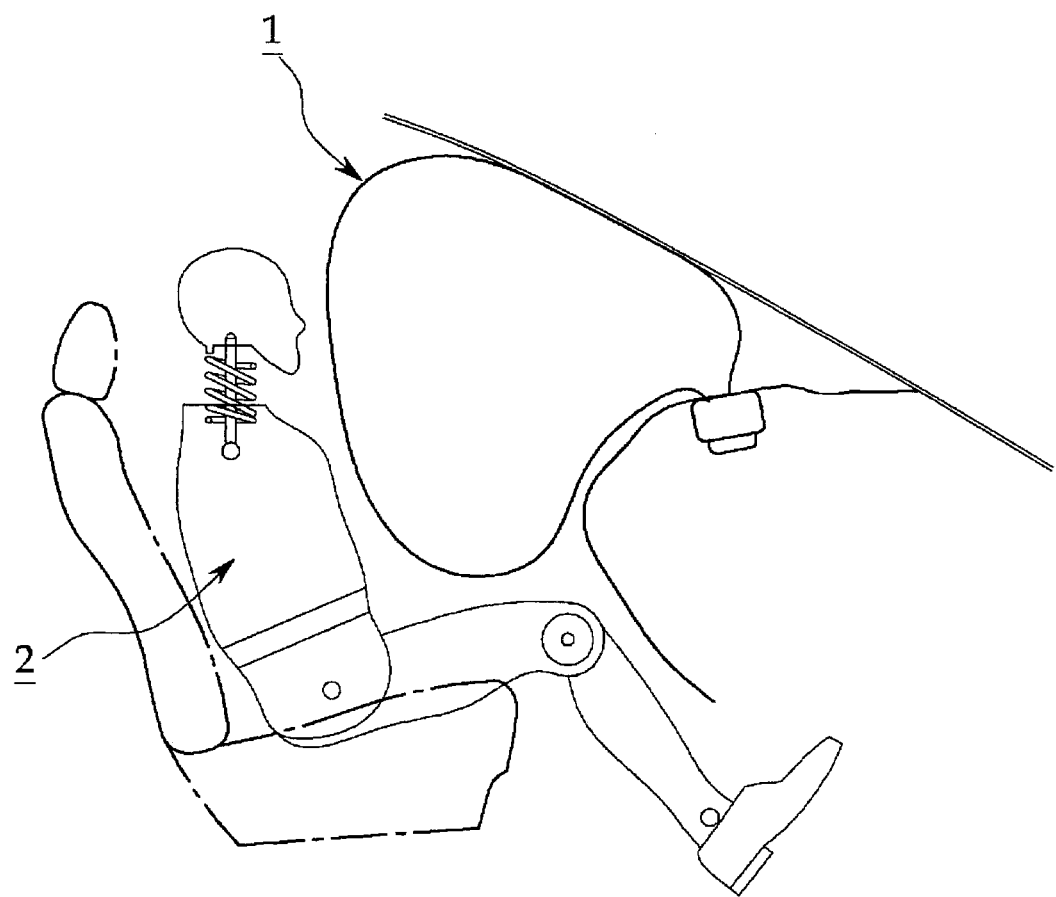
FIG. 1 is a view showing the operation of an airbag when an occupant is normally seated.
Figure 2:
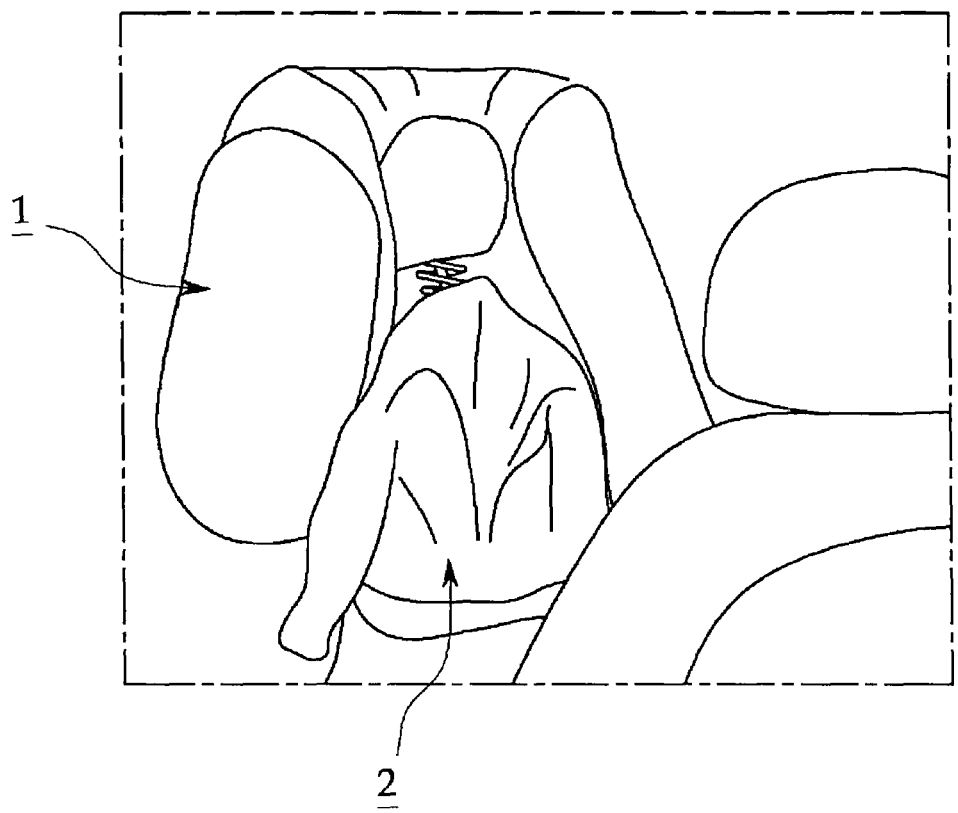
FIG. 2 is a view showing the operation of an airbag when an occupant is abnormally seated.
Figure 3:
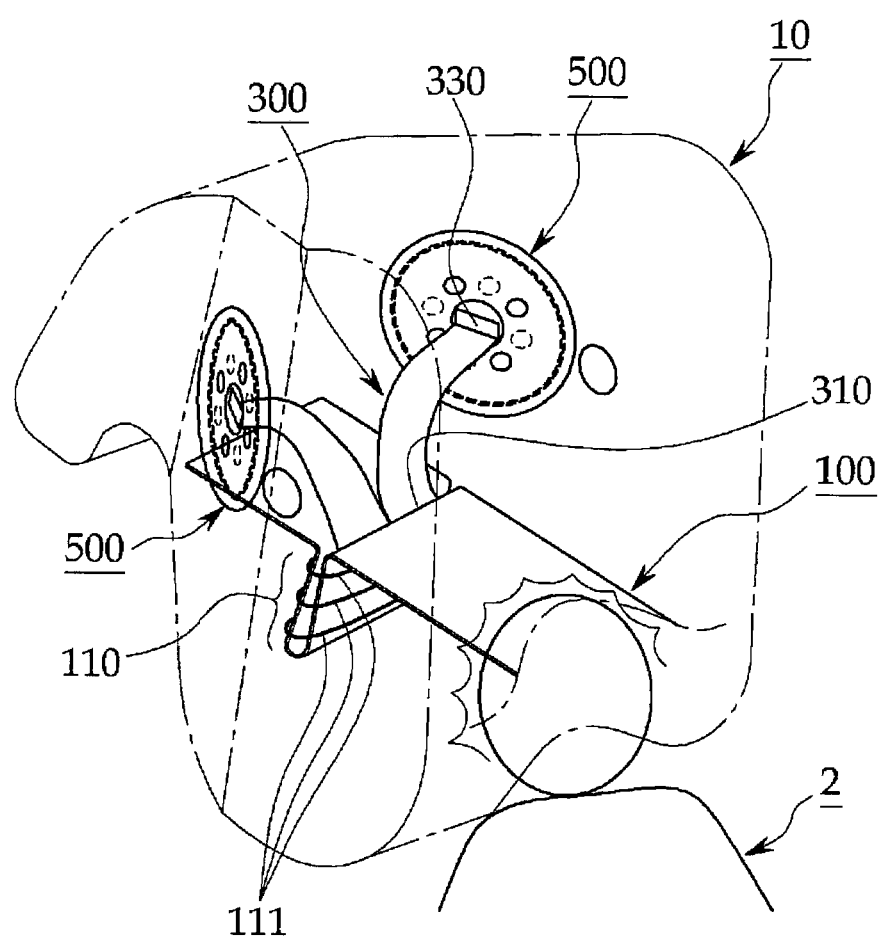
FIG. 3 is a perspective view showing the internal structure of an airbag incorporating the principles of the present invention and including a sub-string or a vent part according to the present invention when an occupant is abnormally seated.

FIG. 3 is a perspective view showing the internal structure of an airbag, including a sub-string and a vent, according to the present invention when an occupant is abnormally seated.

Figure 4:
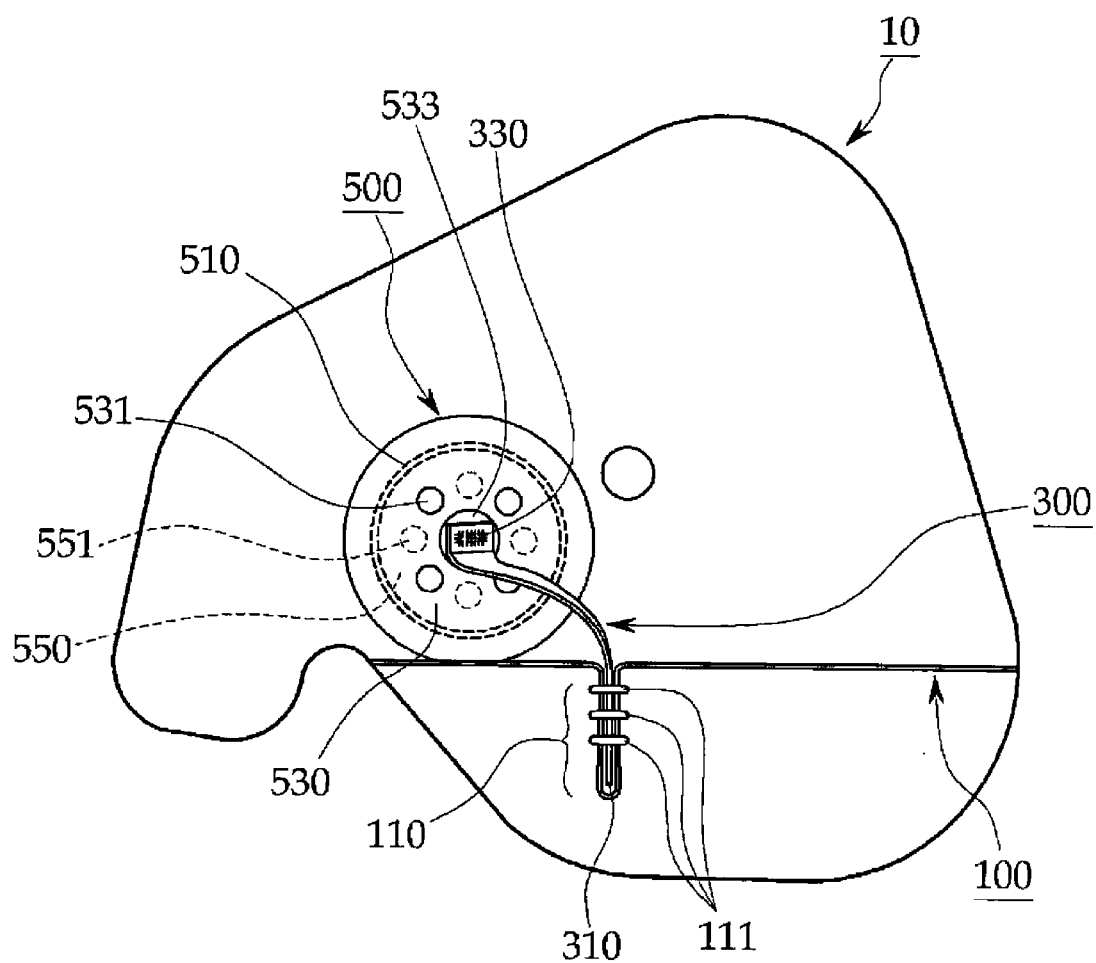
FIG. 4 is a side view showing an airbag including the sub-string and a vent according to the present invention.

FIG. 4 is a side elevational view showing the airbag, including the sub-string and the vent, according to the present invention.

Figure 5:
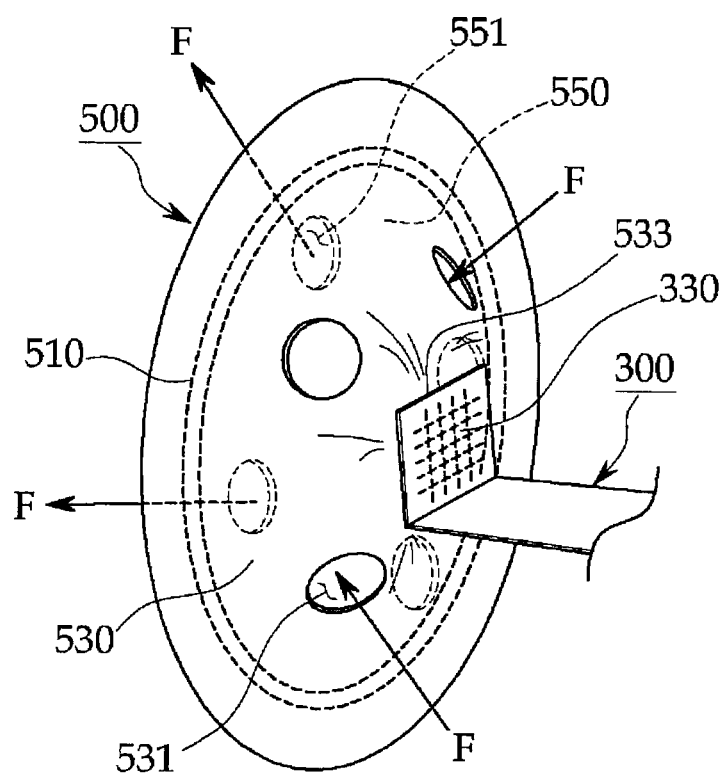
FIG. 5 is an enlarged, perspective view of the vent part seen in FIG. 4.

FIG. 5 is an enlarged view showing the vent, according to the present invention, in greater detail.

Figure 6:
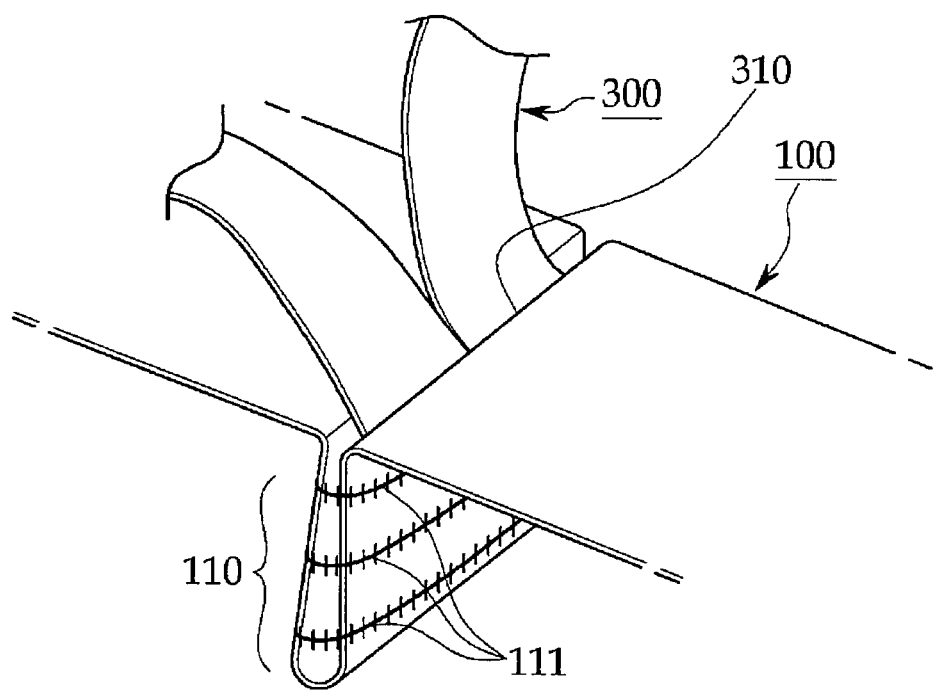
FIG. 6 is an enlarged, perspective view of the folding part seen in FIG. 4, in which a main tether is coupled with the sub-string, according to the present invention.

FIG. 6 is an enlarged view showing the folding part, in which a main tether is coupled with the sub-string, according to the present invention.

Referring to FIGS. 3 and 4, a front airbag 10, which is deployed by gas supplied from an inflator of an airbag module to protect occupants in a vehicle from accident, includes a sub-string 300, a vent part 500 and a main tether 100 provided at the central portion of the airbag cushion. The sub-string 300 is connected to the main tether 100 to control the opening and closing of the vent 500 to selectively discharge selectively air from the airbag 10 to the outside.

As shown in FIGS. 3 and 4, the main tether 100 is formed of a single piece of fabric and generally has the form of a string or strap generally located at the central portion of the inner parts of the airbag 10, such that the airbag 10 has a stable shape when the airbag 10 is deployed. As described above, the main tether 100 maintains the airbag 10 in the stable shape such that the airbag 10 is capable of providing a sufficient buffering effect when the front airbag 10 is inflated. In addition, the main tether 100 is firmly coupled with the internal center of the front and rear surfaces of the front airbag 10.

The main tether 100 is provided, at its center, with a fold or folding part 110. The sub-string 300 enters the folding part 110 and is fixedly coupled with the folding part 110. As described above, the operation of the vent part 500 is controlled by the sub-string 300 according to the operation of the folding part 100.

In other words, since the main tether 100 is coupled with the central portions of inner parts of the front and rear surfaces of the front airbag 10, when the airbag 10 is inflated in the forward or rearward direction, the airbag 10 is not laterally inflated. In this situation, as further discussed below, the sub-string 300 is loosened such that the vent part 500 does not open. However, when the airbag 10 is not inflated in the forward or rearward direction, the airbag 10 is laterally formed. In this situation, the sub-string 300 is tightened, so that the vent 500 opens. This operating relationship will be described in detail below.

The folding part 110 includes a sealing line 111 that connects the sub-string 300 thereto. The sealing line 111 may include a seam that is backstitched. However, the sealing line 111 may not essentially include the seam, but instead the sealing line 111 may include various alternative units to integrate the sub-string 300 entering the folding part 110 and being retained with the folding part 110.

As shown in FIG. 3, a plurality of sealing lines 111 may be provided. Accordingly, since the length of the main tether 100 is determined according to the inflation degree of the front airbag 10 in the forward or rearward direction, the sealing lines 111 may be sequentially torn apart, beginning from the top or upper portion thereof seen in FIG. 3. In other words, as the sealing lines 111 are torn, the length of the sub-string 300 coupled with the sealing lines 111 is adjusted, so that the sub-string 300 may be loosened or tightened relative to the vent 500, thereby adjusting the vent 500. The operating relationship of the sealing lines 111 is further described in detail below.

As shown in FIGS. 3 and 4, one end of the sub-string 300 enters the folding part 110, which is generally positioned at the central portion of the main tether 100. An opposite end of the sub-string 300 is fastened to the vent 500. The sub-string 300 remains fastened or is loosened as the sealing lines 111 of the folding part 110 are torn apart, according to the length of the main tether 100. In this manner, the sub-string 300 controls the discharge of the airbags' internal air through the vent 500.

As shown in FIGS. 3 and 4, the sub-string 300 includes a main tether fixture end 310 entering the main tether 100 and fixedly integrated with the main tether 100 by the sealing lines 111. At its other end, the sub-string 300 includes an inner vent part connection end 330 that is fixedly coupled with the vent 500, or more specifically, an inner vent part 530.

The vent 500 includes the inner vent part 530 and an outer vent part 540, together which allows air to be discharged only when the airbag 10 is laterally inflated as a result of an occupant or a child being abnormally seated during inflation of the airbag 10. As shown in FIG. 5, the inner and outer vent parts 530 and 540 preferably include fabric the same as that of the outer surface of the airbag 10. In addition, the inner and outer vent parts 530 and 540 overlie or overlap with each other and are firmly sealed by a bonding part 510, such as sticking and/or an adhesive/bonding agent.

The inner and outer vent parts 530 and 540 overlap with each other and include inner and outer vent holes 531 and 551, respectively, to selectively discharge the internal air of the airbag 10. The inner and outer vent holes 531 and 551 are alternately arranged and not aligned with each other such that the internal air of the airbag 10 can be selectively discharged.

In other words, as shown in FIG. 4, when the inner and outer vent parts 530 and 550 are immediately adjacent to each other without a gap therebetween, since the inner and outer vent holes 531 and 551 are alternately arranged with each other, the inner and outer vent holes 531 and 551 are occluded or blocked so that the internal air of the airbag 10 may not be discharged to the outside. In contrast, as shown in FIG. 5, when the inner and outer vent parts 530 and 550 are separated and spaced apart from each other, the space therebetween allows the inner and outer vent holes 531 and 551 to communicate with each other, so that the internal air of the airbag 10 can be discharged outside of the airbag 10.

Therefore, the internal air of the airbag 10 can be selectively discharged according to if the inner and outer vent parts 530 and 540 are immediately adjacent to each other or spaced apart from each other. The operation for closing the inner and outer vent parts 530 and 540 relative to each other or spacing the inner and outer vent parts 530 and 540 apart from each other is determined by the operation of loosening or tightening the sub-string 300. The operation of loosening or tightening the sub-string 300 itself is determined by the degree to which the folding part 110, positioned at the central portion of the main tether 100, is released. As a result, the operation of closing the inner and outer vent parts 530 and 540 to each other, or the spacing the inner and outer vent parts 530 and 540 from each other, is determined by the extension degree of the main tether 100, that is, the inflation degree of the airbag 10 in the forward or rearward direction. Therefore, according to the present invention, since the inflation degree of the airbag 10 in the forward or rearward direction is inversely proportional to the lateral inflation degree of the airbag 10, the discharge of the internal airbag air by the vents 500 can be controlled according to the inflation degree of the airbag 10 in the lateral direction.

The inner vent part 530 is provided at the central portion thereof with a sub-string connection part 533, which spaces the inner and outer vent parts 53 and 550 from each other due to tension when the sub-string 300 is tightened. As shown in FIGS. 3 to 5, the inner vent part connection end 330 of the sub-string 300 is firmly fixed to the sub-string connection part 533.

FIG. 6 is a view showing the main tether fixture end 310 entering into the folding part 110 of the main tether 100 according to the present invention, in particular shows the sealing lines 111. A plurality of sealing lines 111 connect together through sewing the folding part 110 and the main tether fixture end 310 of the sub-string 30, which overlap with each other. The sealing lines 111 may be torn sequentially from the top (as viewed in FIG. 6) due to the tension of the main tether 100 resulting in an adjustment to the length of the sub-string 300. As such, the sub-string 300 may be tightened or loosened during inflation of the airbag 10.

Hereinafter, the operating relation of the front airbag 10, including the sub-string 300 and the vent 500, according to the invention will be described in detail with reference to FIGS. 7 and 8.

Figure 7:
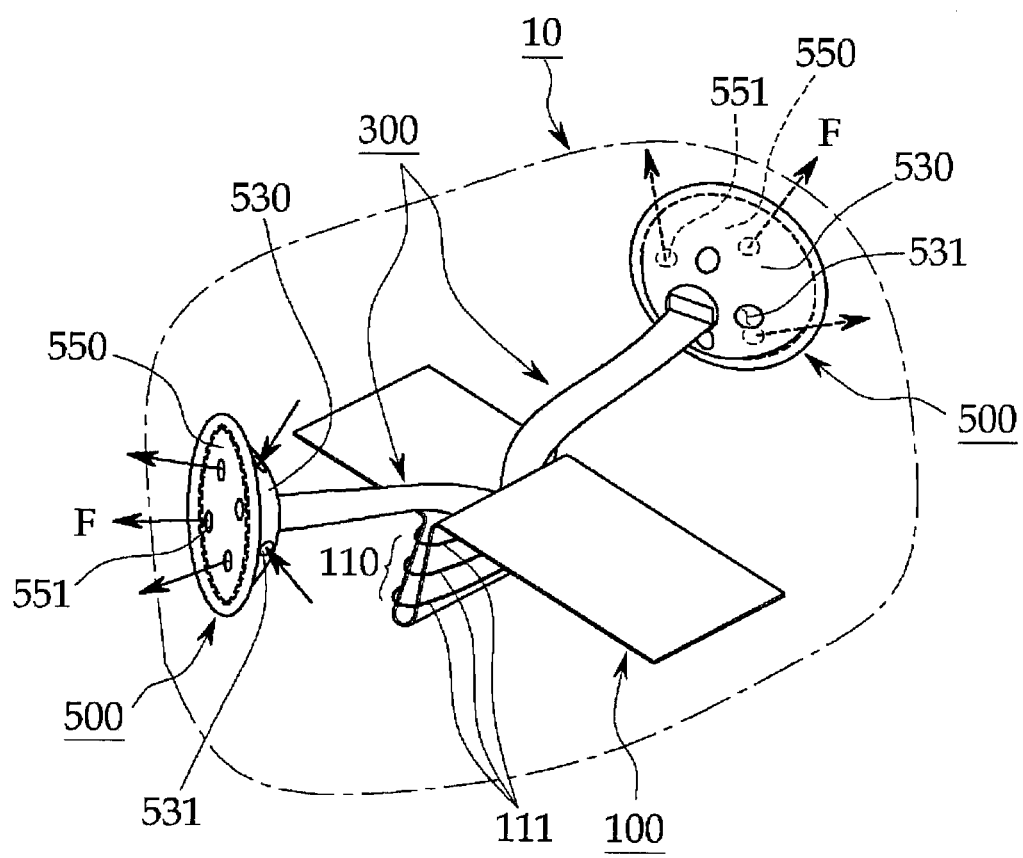
FIG. 7 shows the operational relationship of the sub-string and the vent when an occupant is abnormally seated.
Figure 8:
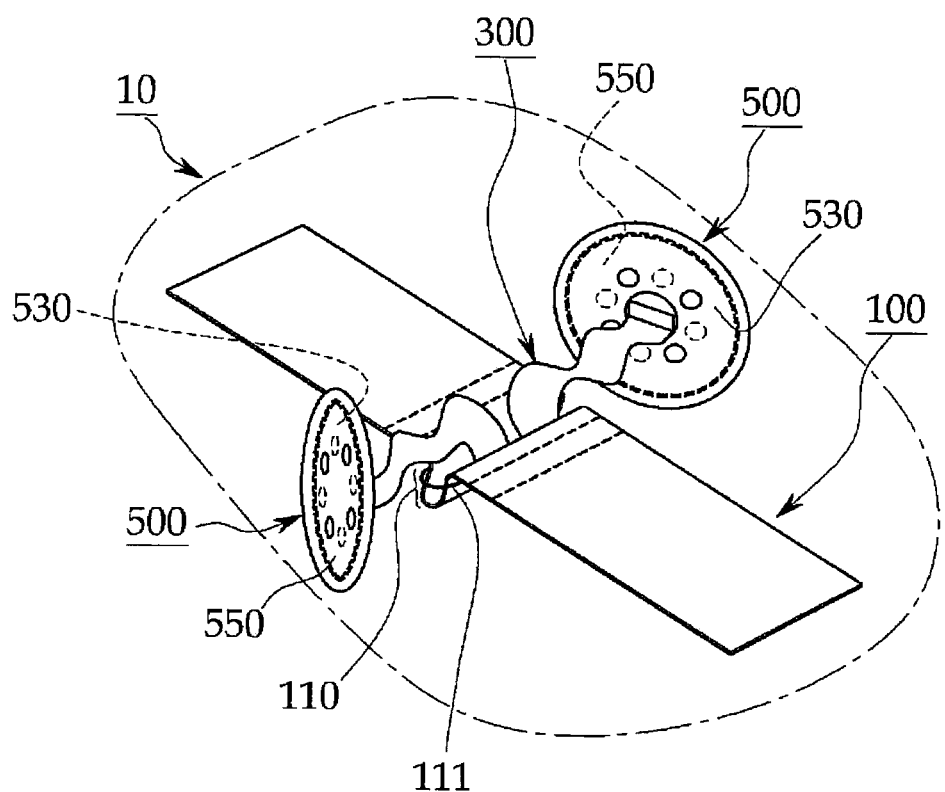
FIG. 8 shows the operational relationship of the sub-string and the vent when the occupant is normally seated.

FIG. 7 shows the operational relationship of the sub-string 300 and the vent 500 according to the present invention when an occupant is abnormally seated. FIG. 8 shows the operational relationship of the sub-string 300 and the vent 500 according to the present invention when the occupant is normally seated.

When an occupant or a child is abnormally or improperly seated, the head of the occupant or the child collides with the front airbag 10 before the front airbag 10 is fully inflated during a vehicle collision. Accordingly, the front airbag 10 is not completely inflated rearward/forwardly, but is laterally inflated.

Since the front airbag 10 is not completely inflated in the forward or rearward direction when lateral inflation occurs, the main tether 100 is not fully elongated. Accordingly, the folding part 110 at the central portion of the main tether 100 is not spread out, so that the sealing lines 111 are not torn. In other words, since the sealing lines 111 are not torn, the sub-string 300 is maintained in a short state and the sub-string 300 is tightened during inflation. In other words, since the front airbag 10 has been already inflated, the sub-string 300 may be more firmly tightened.

Accordingly, the inner vent part 530 is naturally pulled to the internal part of the airbag 10 due to the tension of the sub-string 300, so that the inner vent part 530 is spaced apart from the external vent part 550.

Therefore, since the inner vent part 530 is spaced apart from the external vent part 550, the inner and outer vent holes 531 and 551 are naturally open and communicate with one another, so that the internal air of the airbag 10 can be discharged to the outside.

As described above, since the passenger airbag does not reliably attenuate impact applied to the occupant or the child in the abnormal position upon the lateral inflation of the passenger airbag, the present invention additionally provides a function of attenuating impact by discharging air through vent holes in order to distribute the pressure.

The operational relationship of the front airbag 10 of a passenger seat according to the present invention in the case of an occupant or a child normally seated is hereafter described with reference to FIG. 8. When the occupant or the child is seated normally, the head of the occupant or the child collides with the front airbag 10 after the front airbag 10 has sufficiently inflated at the front upon a vehicle collision. Accordingly, since the front airbag 10 is sufficiently inflated at the front, the lateral inflation of the front airbag 10 does not occur.

In addition, since the front airbag 10 is sufficiently inflated in the forward or rearward direction, the main tether 100 is elongated and the folding part 110, provided at the central portion of the main tether 100, is unfolded, so that the sealing lines 111 are torn. In other words, since the sealing lines 111 are torn, the sub-string 300 is loosened with a longer length. Further, since lateral inflation of the front airbag 10 does not occur, the sub-string 300 is not tightened at all, so that the sub-string 300 has no tension.

Therefore, the sub-string 300 is loose, so that the inner vent part 530 is not pulled to the internal part of the front airbag 10. Rather, the inner vent part 530 is more immediately adjacent to the outer vent part 550 due to the internal air pressure of the front airbag 10. Since the inner and outer vent holes 531 and 551 are alternately arranged with each other, the inner and outer vent holes 531 and 551 are closed off, and the internal air of the airbag 10 is not discharged to the outside.

As described above, according to the present invention, upon vehicle collision when an occupant is normally seated, the front airbag sufficiently acts as a typical airbag upon vehicle collision, attenuates the impact of the occupant when the occupant collides with the front airbag 10, and restrains the head of the occupant while protecting the head of the occupant when the occupant behaves, so that the front airbag can firmly restrain the occupant.

As described above, according to the present invention, a passenger airbag can protect a grown person from an accident when the grown person is in a normal position on the passenger seat upon vehicle collision, and when the grown person may be in an abnormal position on the passenger seat or when a child is seated in the passenger seat, the passenger airbag discharges air through the vent at the lateral surface thereof to adjust the pressure, such that impact can be attenuated while the cushion is being deployed. Accordingly, the grown person abnormally seated or the child can be prevented from being injured.

Although the exemplary embodiments of the present invention have been described, it is understood that the exemplary embodiments help one ordinary skilled in the art to easily realize an airbag including a sub-string and a vent part according to the present invention, but the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. A front airbag deployed by gas supplied from an inflator of an airbag module to protect an occupant of a vehicle, comprising:
   an airbag cushion;
   a main tether installed at a central portion of an airbag cushion;
   a vent selectively discharging air outside of the front airbag;
   a sub-string connected to and between the main tether and the vent, whereby the sub-string controls opening/closing of the vent;
   wherein the main tether includes portions secured together to form a folding part, the folding part receiving the sub-string and being secured to the sub-string, wherein the portions secured together are releasably together and configured to separate during deployment of the airbag.

2. The front airbag of claim 1, wherein the sub-string includes a main tether fixture end entering the folding part, and the folding part of the main tether includes a sealing line securing the folding part to the main tether fixture end such that the folding part is integrated with the main tether fixture end in a state in which the main tether fixture end enters the folding part.

3. The front airbag of claim 2, wherein a plurality of sealing lines secure the folding part with the main tether fixture end.

4. A front airbag deployed by gas supplied from an inflator of an airbag module to protect an occupant of a vehicle, comprising:
   an airbag cushion;
   a main tether installed at a central portion of an airbag cushion;
   a vent selectively discharging air outside of the front airbag;
   a sub-string connected to and between the main tether and the vent, whereby the sub-string controls opening/closing of the vent;
   the main tether includes a folding part, the folding part receiving the sub-string and being secured to the sub-string;
   wherein the sub-string includes a main tether fixture end entering the folding part, and the folding part of the main tether includes a sealing line securing the folding part to the main tether fixture end such that the folding part is integrated with the main tether fixture end in a state in which the main tether fixture end enters the folding part;

a plurality of sealing lines securing the folding part with the main tether fixture end; and wherein the sealing lines are sequentially torn from an upper most sealing line when the front airbag is laterally expanded.

5. The front airbag of claim 4, wherein the sealing lines are frangible and sequentially torn from an upper most sealing line when the front airbag is laterally expanded.

6. The front airbag of claim 4, wherein the sub-string is tightened when the front airbag is laterally inflated, and the sub-string is loosened when the front airbag is not laterally inflated as the sealing lines are sequentially torn, wherein the inner vent part is spaced apart from the outer vent part such that the internal air of the front airbag is discharged to an outside when the airbag is laterally inflated, and wherein the inner vent part is immediately adjacent to the outer vent part when the front airbag is not laterally inflated, so that the internal air of the front airbag is not discharged to the outside.

7. A front airbag deployed by gas supplied from an inflator of an airbag module to protect an occupant of a vehicle, comprising:

an airbag cushion;

a main tether installed at a central portion of an airbag cushion and extending between opposing sides thereof, wherein the main tether includes a folding part located between opposing ends of the main tether;

a vent selectively discharging air outside of the front airbag; and a sub-string connected to and between the main tether and the vent, whereby the sub-string controls opening/closing of the vent, the sub-string being received within the folding part and being releasably secured to the main tether within the folding part.

\* \* \* \* \*